(12) United States Patent
Tang

(10) Patent No.: US 7,443,614 B2
(45) Date of Patent: Oct. 28, 2008

(54) COMPACT IMAGE PICKUP LENS

(75) Inventor: Nai-Yuan Tang, An-He Road (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 11/691,338

(22) Filed: Mar. 26, 2007

(65) Prior Publication Data

US 2008/0024880 A1    Jan. 31, 2008

(30) Foreign Application Priority Data

Jul. 26, 2006    (TW) ............................... 95127377 A

(51) Int. Cl.
*G02B 9/12* (2006.01)
(52) U.S. Cl. ...................... 359/791; 359/784; 359/785
(58) Field of Classification Search ................ 359/791, 359/784, 785, 771–775, 763–766, 754–758
See application file for complete search history.

(56) References Cited

U.S. PATENT DOCUMENTS 7,286,305 B2 * 10/2007 Nakamura .................. 359/784

* cited by examiner

*Primary Examiner*—Timothy J Thompson

(57) ABSTRACT

A compact image pickup lens includes, in order from an object side to an image side, a first lens element G1 of positive refractive power, a second lens element G2 of positive refractive power, and a third lens element G3 of negative refractive power. The first lens element has a meniscus shape with its convex surface L1 on the object side. The second lens element also has a meniscus shape but with its convex surface L4 on the image side. Each of the first, second and third lens elements has at least one aspheric surface. An aperture STO is further positioned in front of the second lens element. The image pickup lens satisfies the following conditions: $0.85 \leq (v1/v2) \leq 1.15$ and $0.85 \leq (v2/v3) \leq 1.25$, where v1 is the Abbe number at the d-line (587.5618 nm) of the first lens element, v2 is the Abbe number at the d-line (587.5618 nm) of the second lens element, and v3 is the Abbe number at the d-line (587.5618 nm) of the third lens element.

19 Claims, 6 Drawing Sheets

COMPACT IMAGE PICKUP LENS

BACKGROUND OF THE INVENTION

1. Field of the Invention

The present invention relates to an image pickup lens, and particularly relates to a compact image pickup lens for use in a photographic device.

2. Description of Prior Art

In recent years, most mobile phones, portable Personal Digital Assistances (PDA) and notebook computers have been equipped with photographic lens modules. Such a photographic lens module is generally required to be small in volume and light in weight. However, in the past, since the image sensor, such as a CCD (Charge Coupled Device) sensor or a CMOS (Complementary Metal-Oxide Semiconductor) sensor, has a very low resolution, a conventional photographic lens module generally only consists of one or two lens elements.

Currently, with the progress of semi-conductor manufacturing technologies, the resolution of an image sensor applied in the mobile phones, PDAs and notebook computers has been increased to at least one million pixels. Accordingly, if the component number of the photographic lens module used in the above photographic devices is too small, a high image performance may not be obtained. Therefore, how to provide a high-resolution image with a minimum number of the component lens elements so as to still satisfy the compactness requirement is a problem to be addressed.

SUMMARY OF THE INVENTION

The object of the present invention is to provide a compact image pickup lens that only consists of three lens elements to reduce the length and weight thereof while ensuring a high image performance by optical aberration correction.

To achieve the above object of the present invention, a compact image pickup lens in accordance with the present invention includes, in order from an object side to an image side, a first lens element of positive refractive power, a second lens element of positive refractive power, and a third lens element of negative refractive power. The first lens element has a meniscus shape with its convex surface on the object side. The second lens element also has a meniscus shape but with its convex surface on the image side. Each of the first, second and third lens elements has at least one aspheric surface. The present compact image pickup lens further includes an aperture positioned in front of the second lens element.

The present compact image pickup lens satisfies the following conditions: $0.85 \leq (v1/v2) \leq 1.15$ and $0.85 \leq (v2/v3) \leq 1.25$, where v1 represents the Abbe number at the d-line (587.5618 nm) of the first lens element, v2 represents the Abbe number at the d-line (587.5618 nm) of the second lens element, and v3 represents the Abbe number at the d-line (587.5618 nm) of the third lens element.

The third lens element of the present compact image pickup lens has a negative on-axis refractive power and a positive peripheral refractive power. The third lens element has a concave surface that is located adjacent to an image plane and is concave toward the object side.

Preferably, the aperture is positioned between the first lens element and the second lens element.

The present image pickup lens has the advantages of lightweight and short length, since only three lens elements are employed. Preferably, all the first, second and third lens elements are made of plastic.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

The present compact image pickup lens can be applied in an image pickup device for imaging an object on an image sensor such as a CCD sensor or a CMOS sensor. The present compact image pickup lens includes, in order from an object side to an image side, a first lens element of positive refractive power, a second lens element of positive refractive power, and a third lens element of negative refractive power. The first lens element has a meniscus shape with its convex surface on the object side. The second lens element also has a meniscus shape but with its convex surface on the image side.

As described above, the present compact image pickup lens includes, in order from the object side to the image side, a positive first lens element, a positive second lens element and a negative third lens element. The third lens element has a negative on-axis refractive power and a positive peripheral refractive power. The third lens element has a concave surface that is located adjacent to an image plane and is preferably concave toward the object side.

The present compact image pickup lens further includes an aperture positioned in front of the second lens element. Preferably, the aperture is positioned between the first lens element and the second lens element.

The present compact image pickup lens satisfies the following conditions:

$$0.85 \leq (v1/v2) \leq 1.15 \qquad (1)$$

$$0.85 \leq (v2/v3) \leq 1.25 \qquad (2)$$

where v1 represents the Abbe number at the d-line (587.5618 nm) of the first lens element, v2 represents the Abbe number at the d-line (587.5618 nm) of the second lens element, and v3 represents the Abbe number at the d-line (587.5618 nm) of the third lens element. Preferably, all the first, second and third lens elements are made of plastic.

Each of the first, second and third lens elements has at least one aspheric surface. Preferably, one surface of the third lens element, which is adjacent to the image plane, is made aspheric.

As is clear from the above description, since only three lens elements are employed, the present image pickup lens has the advantages of light weight, low cost and short length.

A detailed description of the present compact image pickup lens is further provided hereinafter.

Figure 1:
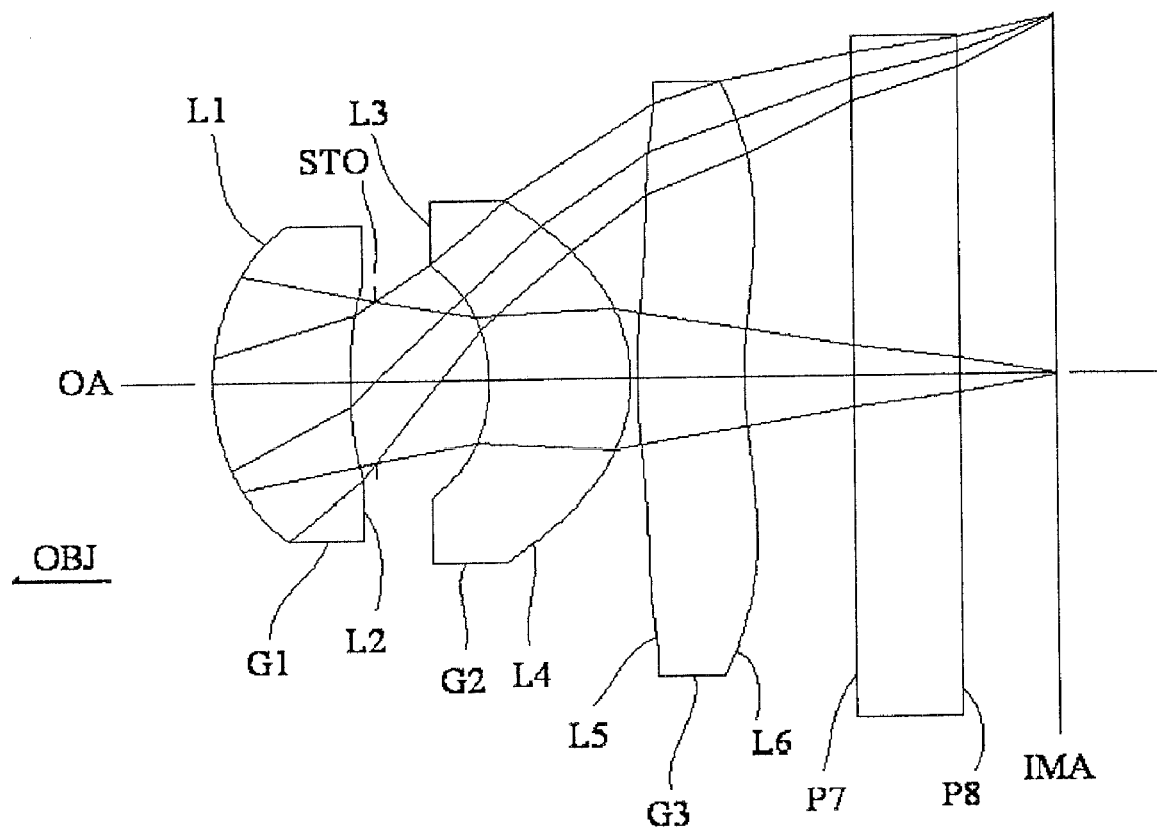
FIG. 1 is a cross-sectional view of a compact image pickup lens in accordance with a first embodiment of the present invention.

Referring to FIG. 1, the present compact image pickup lens in accordance with a first embodiment of the present invention includes, from an object side OBJ to an image side IMA, a first lens element G1 of positive refractive power, a second lens element G2 of positive refractive power, and a third lens element G3 of negative refractive power. The system focal length f of the present compact image pickup lens of the first embodiment is 2.8 mm, and the F-number (Fno) is 4.43.

The first lens element G1 is a meniscus lens, and has an object-side surface L1 and an image-side surface L2 both of which are aspheric surfaces. The object-side surface L1 is convex toward the object side OBJ. The Abbe number v1 at the d-line (587.5618 nm) of the first lens element G1 is 56.

The second lens element G2 is also a meniscus lens, and has an object-side surface L3 and an image-side surface L4 both of which are aspheric surfaces. The image-side surface L4 is convex toward the image side IMA. The Abbe number v2 at the d-line (587.5618 nm) of the second lens element G2 is 56.

The third lens element G3 is a negative lens, and has a negative on-axis refractive power and a positive peripheral refractive power. The third lens element G3 has an object-side surface L5 and an image-side surface L6 both of which are aspheric surfaces. The image-side surface L6 is concave toward the object side OBJ. The Abbe number v3 at the d-line (587.5618 nm) of the third lens element G3 is 56.

The parameters of the first, second and third lens elements G1, G2, G3 of the first embodiment are listed in Table 1 as provided below.

TABLE 1

System Focal Length f = 2.8 mm, Fno. = 4.43

| Surface | Radius Curvature (mm) | Thickness or Distance (mm) | Refractive Index (Nd) | Abbe Number (Vd) |
|---|---|---|---|---|
| L1 | 1.593 | 1.00 | 1.525 | 56 |
| L2 | 3.145 | 0.19 | 1.000 | |
| STO | Infinity | 0.84 | 1.000 | |
| L3 | −1.144 | 1.07 | 1.525 | 56 |
| L4 | −1.126 | 0.05 | 1.000 | |
| L5 | 3.959 | 0.79 | 1.525 | 56 |
| L6 | 2.979 | 0.80 | 1.000 | |
| P7 | Infinity | 0.80 | 1.5168 | 64.17 |
| P8 | Infinity | 0.71 | 1.000 | |

In the first embodiment, the surfaces L1, L2 of the first lens element G1, the surfaces L3, L4 of the second lens element G2 and the surfaces L5, L6 of the third lens element G3 are all aspheric surfaces. Relative parameters of these aspheric surfaces are listed in Table 2 (including Tables 2-1 and 2-2) as provided below.

TABLE 2-1

| Surface | K | E4 | E6 | E8 |
|---|---|---|---|---|
| L1 | −0.316606 | 0.0211578 | 0.0115944 | −0.00519998 |
| L2 | 4.314233 | −0.00454571 | 0.250795 | −0.93661 |
| L3 | −0.322731 | −0.0779431 | −0.479243 | 0.457364 |
| L4 | −0.708159 | 0.001049 | −0.0930141 | 0.136729 |
| L5 | −0.287817 | −0.08365 | 0.0239588 | −0.00121568 |
| L6 | −1.747252 | −0.100458 | 0.0278774 | −0.0058658 |

TABLE 2-2

| Surface | E10 | E12 | E14 | E16 |
|---|---|---|---|---|
| L1 | 0.0303318 | −0.0470834 | 0.0369086 | −0.01012 |
| L2 | 1.60071 | −0.621181 | −0.695896 | 0.0257509 |
| L3 | 0.457364 | 0.58652 | −0.908866 | 0.28028 |
| L4 | −0.101186 | 0.0132277 | 0.0198597 | −0.00642623 |
| L5 | −0.000623994 | 0.000109251 | −3.10646E−06 | −5.07824E−07 |
| L6 | 0.000738036 | −2.60573E−06 | −9.18641E−06 | 4.762E−07 |

As shown in Table 1, the Abbe number v1 of the first lens element G1, the Abbe number v2 of the second lens element G2 and the Abbe number v3 of the third lens element G3 are all 56. Accordingly, v1/v2 gets 1, and v2/v3 gets 1. Therefore, the above conditions (1) and (2) are both satisfied.

Figure 2A:
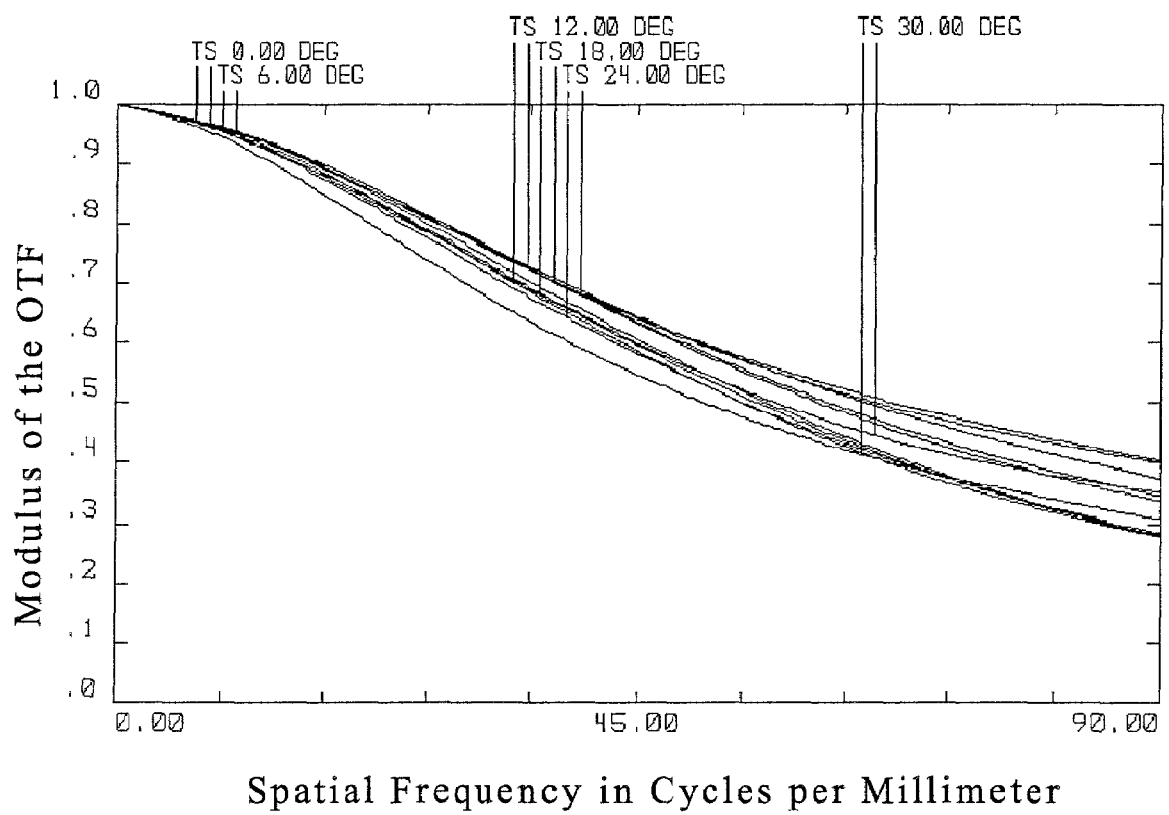
FIG. 2A is a graph showing the modulus of the optical transfer function for spatial frequency (in cycles per millimeter) in connection with the compact image pickup lens of the first embodiment.
Figure 2B:
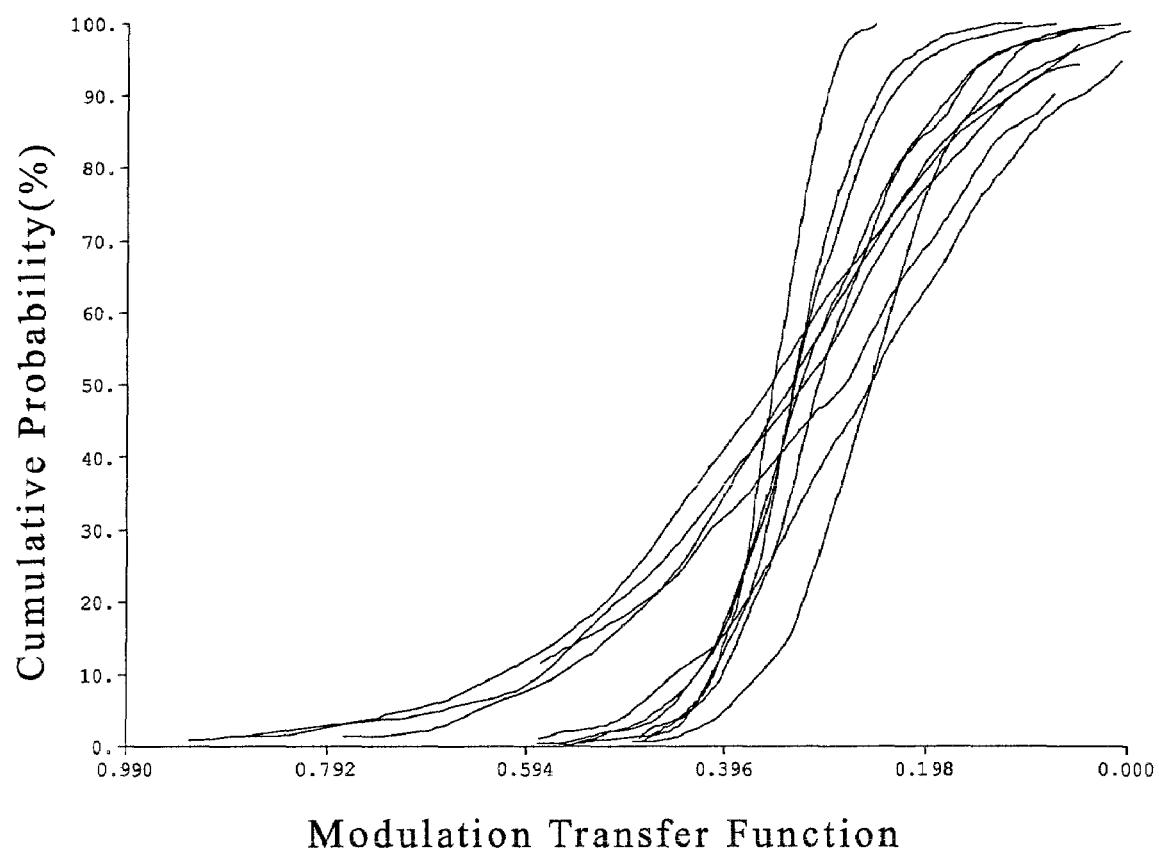
FIG. 2B is a graph showing the tolerance analysis result of full field MTF (Modulation Transfer Function) values at 901 p/mm for the compact image pickup lens of the first embodiment.

FIG. 2A is a graph showing the modulus of the optical transfer function (OTF) for spatial frequency (in cycles per millimeter) in connection with the compact image pickup lens of the first embodiment. FIG. 2B is a graph showing the tolerance analysis result of full field MTF (Modulation Transfer Function) values at 901 p/mm for the compact image pickup lens of the first embodiment. It can be seen in FIG. 2B that the cumulative probability of being greater than 0.2 exceeds 60%.

Figure 3:
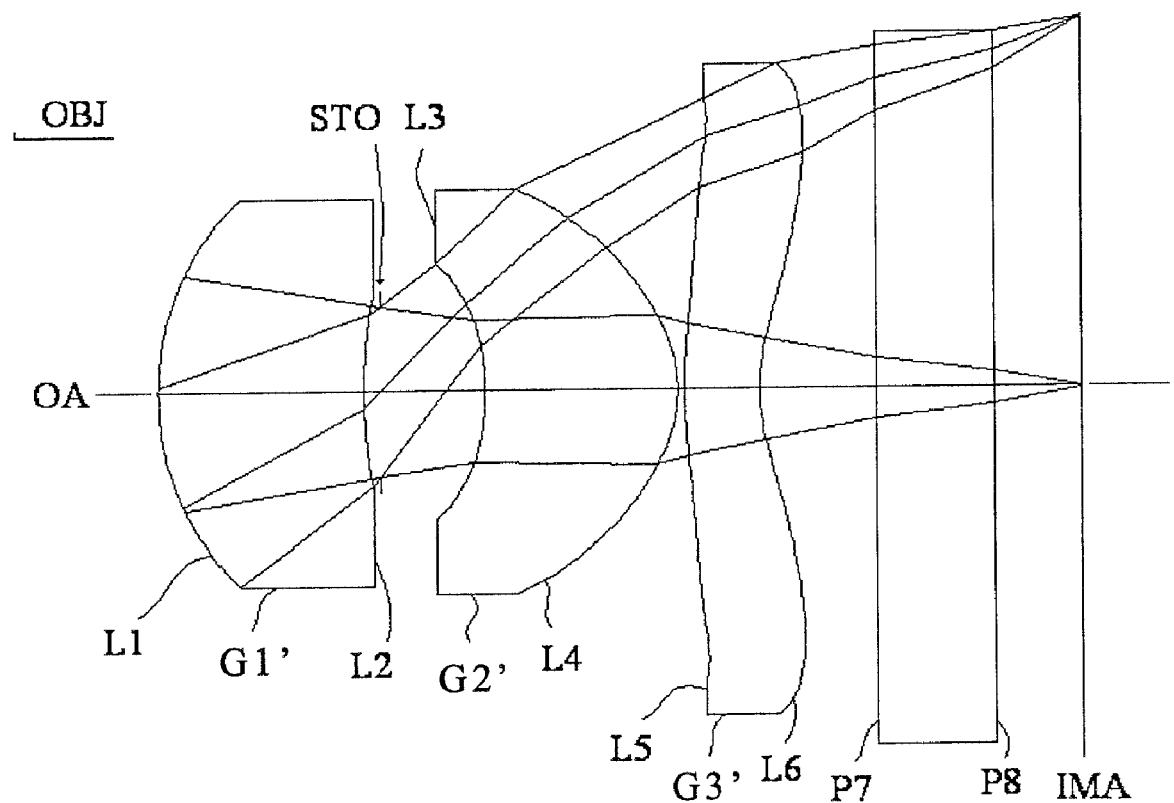
FIG. 3 is a cross-sectional view of a compact image pickup lens in accordance with a second embodiment of the present invention.

Referring to FIG. 3, the compact image pickup lens in accordance with a second embodiment of the present invention includes, from an object side OBJ to an image side IMA, a first lens element G1 of positive refractive power, a second lens element G2 of positive refractive power, and a third lens element G3 of negative refractive power. The system focal length f of the present compact image pickup lens of the second embodiment is 2.8 mm, and the F-number (Fno) is 4.43.

The first lens element G1 is a meniscus lens, and has an object-side surface L1 and an image-side surface L2 both of which are aspheric surfaces. The object-side surface L1 is convex toward the object side OBJ. The Abbe number v1 at the d-line (587.5618 nm) of the first lens element G1 is 70.

The second lens element G2 is also a meniscus lens, and has an object-side surface L3 and an image-side surface L4 both of which are aspheric surfaces. The image-side surface L4 is convex toward the image side IMA. The Abbe number v2 at the d-line (587.5618 nm) of the second lens element G2 is 70.

The third lens element G3 is a negative lens, and has a negative on-axis refractive power and a positive peripheral refractive power. The third lens element G3 has an object-side surface L5 and an image-side surface L6 both of which are aspheric surfaces. The image-side surface L6 is concave toward the object side OBJ. The Abbe number v3 at the d-line (587.5618 nm) of the third lens element G3 is 56.

The parameters of the first, second and third lens elements G1, G2, G3 of the second embodiment are listed in Table 3 as provided below.

TABLE 3

System Focal Length f = 2.8 mm, Fno. = 4.43

| Surface | Radius Curvature (mm) | Thickness or Distance (mm) | Refractive Index (Nd) | Abbe Number (Vd) |
|---|---|---|---|---|
| L1 | 1.864 | 1.39 | 1.54 | 70 |
| L2 | 3.452 | 0.11 | 1.000 | |
| STO. | Infinity | 0.84 | 1.000 | |
| L3 | −1.656 | 1.33 | 1.5015 | 70 |
| L4 | −0.837 | 0.05 | 1.000 | |
| L5 | 3.721 | 0.5 | 1.525 | 56 |
| L6 | 1.095 | 0.80 | 1.000 | |
| P7 | Infinity | 0.80 | 1.5168 | 64.17 |
| P8 | Infinity | 0.60 | 1.000 | |

In the second embodiment, the surfaces L1, L2 of the first lens element G1, the surfaces L3, L4 of the second lens element G2 and the surfaces L5, L6 of the third lens element G3 are all aspheric surfaces. Relative parameters of these aspheric surfaces are listed in Table 4 (including Tables 4-1 and 4-2) as provided below.

TABLE 4-1

| Surface | K | E4 | E6 | E8 |
|---|---|---|---|---|
| L1 | −0.580231 | 0.0228818 | −0.00839148 | 0.000819163 |
| L2 | 5.742227 | 0.00103754 | 0.230143 | −1.52144 |
| L3 | −3.265107 | −0.187364 | −0.0444653 | −0.499144 |
| L4 | −2.302380 | −0.0413259 | −0.141386 | 0.157312 |
| L5 | −2.225899 | −0.0884449 | 0.0369153 | −0.00487975 |
| L6 | −6.753998 | −0.0686475 | 0.0265519 | −0.00638302 |

TABLE 4-2

| Surface | E10 | E12 | E14 | E16 |
|---|---|---|---|---|
| L1 | 0.0383694 | −0.051821 | 0.027889 | −0.00542557 |
| L2 | 4.20072 | −3.85756 | −0.790565 | 0.214415 |
| L3 | 0.717434 | 0.397411 | −1.68285 | 0.898962 |
| L4 | −0.0851881 | 0.00225215 | 0.0180014 | −0.00581729 |
| L5 | −0.000313012 | −9.38789E−05 | 9.06596E−05 | −1.31912E−05 |
| L6 | 0.000801524 | −1.81967E−05 | −8.78242E−06 | 3.95783E−07 |

As shown in Table 3, the Abbe number v1 of the first lens element G1 is 70, the Abbe number v2 of the second lens element G2 is 70, and the Abbe number v3 of the third lens element G3 is 56. Accordingly, v1/v2 gets 1, and v2/v3 gets 1.25. Therefore, the above conditions (1) and (2) are both satisfied.

Figure 4A:
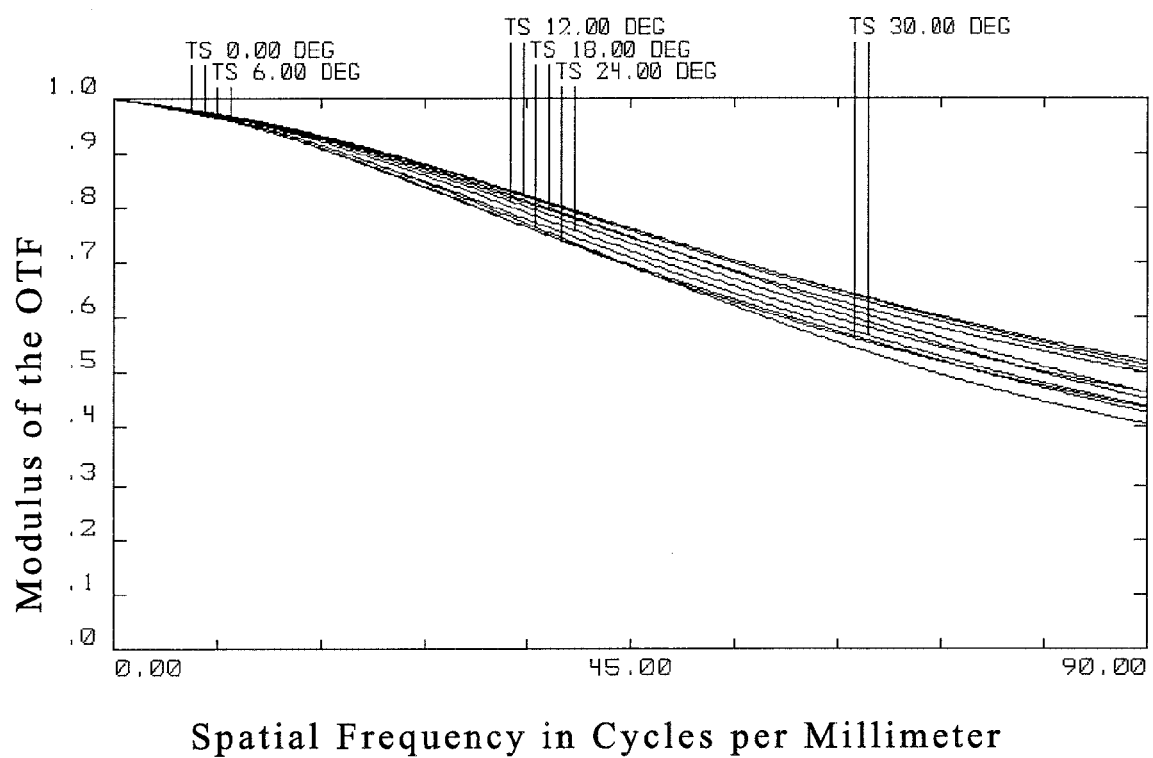
FIG. 4A is a graph showing the modulus of the optical transfer function for spatial frequency (in cycles per millimeter) in connection with the compact image pickup lens of the second embodiment.
Figure 4B:
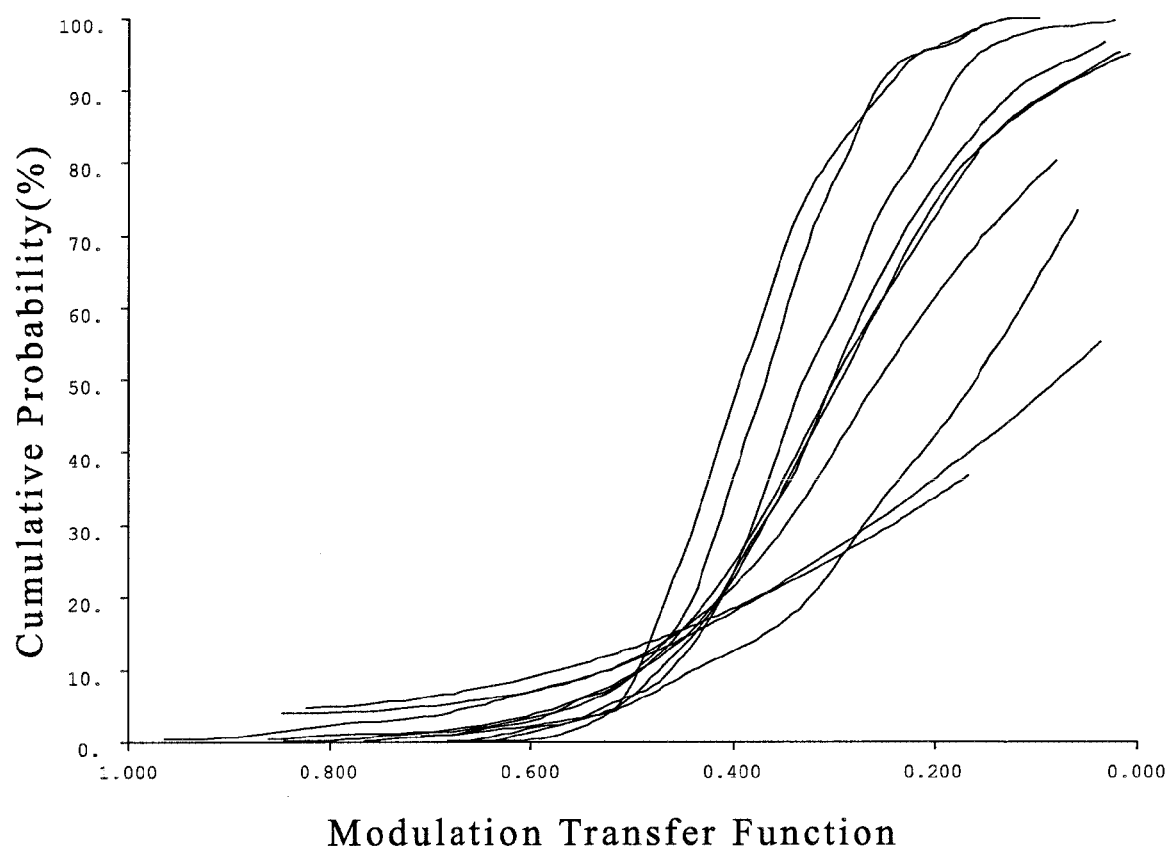
FIG. 4B is a graph showing the tolerance analysis result of full field MTF values at 901 p/mm for the compact image pickup lens of the second embodiment.

FIG. 4A is a graph showing the modulus of the optical transfer function (OTF) for spatial frequency (in cycles per millimeter) in connection with the compact image pickup lens of the second embodiment. FIG. 4B is a graph showing the tolerance analysis result of full field MTF (Modulation Transfer Function) values at 901 p/mm for the compact image pickup lens of the second embodiment. It can be seen in FIG. 4B that the cumulative probability of being greater than 0.2 is lower than 40%.

As described above, the present compact image pickup lens obtains a high image quality. Although all the first, second and third lens elements G1, G2, G3 are preferably made of plastic by injection molding, the present compact image pickup lens will not be affected by temperature change that may degrade the image quality.

In addition, as shown in FIGS. 1 and 3 and Tables 1 and 3, the aperture STO of the present compact image pickup lens is preferably located between the first lens element G1 and the second lens element G2.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image pickup lens, in order from an object side to an image side along an optical axis thereof, comprising:
   a first lens element of positive refractive power, the first lens element having a meniscus shape and an object-side surface convex toward the object side;
   a second lens element of positive refractive power, the second lens element having a meniscus shape and an image-side surface convex toward the image side; and
   a third lens element of negative refractive power, the third lens element having an aspheric surface on the image side;
   wherein, the first, second and third lens elements satisfy the following conditions:

$$0.85 \leq \frac{v1}{v2} \leq 1.15$$

$$0.85 \leq \frac{v2}{v3} \leq 1.25$$

where, v1 represents the Abbe number at the d-line of the first lens element, v2 represents the Abbe number at the d-line of the second lens element, and v3 represents the Abbe number at the d-line of the third lens element; the wavelength at the d-line being 587.5618 nm; and
   wherein the first and second lens elements have the same Abbe number at the d-line.

2. The image pickup lens as claimed in claim 1, wherein the third lens element has a negative on-axis refractive power and a positive peripheral refractive power.

3. The image pickup lens as claimed in claim 2, wherein each of the first and second lens elements has at least one aspheric surface.

4. The image pickup lens as claimed in claim 2, further comprising an aperture positioned in front of the second lens element.

5. The image pickup lens as claimed in claim 4, wherein each of the first and second lens elements has at least one aspheric surface.

6. The image pickup lens as claimed in claim 1, further comprising an aperture positioned in front of the second lens element.

7. The image pickup lens as claimed in claim 6, wherein each of the first and second lens elements has at least one aspheric surface.

8. The image pickup lens as claimed in claim 1, wherein each of the first and second lens elements has at least one aspheric surface.

9. An image pickup lens, in order from an object side to an image side along an optical axis thereof, comprising:

a first lens element of positive refractive power, the first lens element having a meniscus shape and an object-side surface convex toward the object side;

a second lens element of positive refractive power, the second lens element having a meniscus shape and an image-side surface convex toward the image side;

an aperture positioned between the first and second lens elements; and a third lens element of negative refractive power, the third lens element having an aspheric surface on the image side;

wherein, the first, second and third lens elements satisfy the following conditions:

$$0.85 \le \frac{v1}{v2} \le 1.15$$

$$0.85 \le \frac{v2}{v3} \le 1.25$$

where, v1 represents the Abbe number at the d-line of the first lens element, v2 represents the Abbe number at the d-line of the second lens element, and v3 represents the Abbe number at the d-line of the third lens element; the wavelength at the d-line being 587.5618 nm; and wherein the first and second lens elements have the same Abbe number at the d-line.

10. The image pickup lens as claimed in claim 9, wherein the third lens element has a negative on-axis refractive power and a positive peripheral refractive power.

11. The image pickup lens as claimed in claim 10, wherein each of the first and second lens elements has at least one aspheric surface.

12. The image pickup lens as claimed in claim 9, wherein each of the first and second lens elements has at least one aspheric surface.

13. An image pickup lens, in order from an object side to an image side along an optical axis thereof, comprising:

a first lens element of positive refractive power, the first lens element having a meniscus shape and an object-side surface convex toward the object side;

a second lens element of positive refractive power, the second lens element having a meniscus shape and an image-side surface convex toward the image side; and a third lens element of negative refractive power, the third lens element having an aspheric surface on the image side, and having a negative on-axis refractive power and a positive peripheral refractive power;

wherein, the first, second and third lens elements satisfy the following conditions:

$$0.85 \le \frac{v1}{v2} \le 1.15$$

$$0.85 \le \frac{v2}{v3} \le 1.25$$

where, v1 represents the Abbe number at the d-line of the first lens element, v2 represents the Abbe number at the d-line of the second lens element, and v3 represents the Abbe number at the d-line of the third lens element; the wavelength at the d-line being 587.5618 nm; and wherein the first and second lens elements have the same Abbe number at the d-line.

14. The image pickup lens as claimed in claim 13, further comprising an aperture positioned in front of the second lens element.

15. The image pickup lens as claimed in claim 14, wherein each of the first and second lens elements has at least one aspheric surface.

16. The image pickup lens as claimed in claim 13, wherein each of the first and second lens elements has at least one aspheric surface.

17. The image pickup lens as claimed in claim 1, wherein the first, second and third lens elements have the same Abbe number at the d-line.

18. The image pickup lens as claimed in claim 9, wherein the first, second and third lens elements have the same Abbe number at the d-line.

19. The image pickup lens as claimed in claim 13, wherein the first, second and third lens elements have the same Abbe number at the d-line.

* * * * *